(No Model.)

H. J. BREWER.
GALVANIC BATTERY.

No. 323,905. Patented Aug. 11, 1885.

Witnesses:
Geo. W. Miatt
Wm. A. Pollock

Inventor:
Horatio J. Brewer
By his attorney,
E. N. Dickerson Jr.

UNITED STATES PATENT OFFICE.

HORATIO J. BREWER, OF NEW YORK, N. Y.

GALVANIC BATTERY.

SPECIFICATION forming part of Letters Patent No. 323,905, dated August 11, 1885.

Application filed March 16, 1885. (No model.)

*To all whom it may concern:*

Be it known that I, HORATIO J. BREWER, of the city, county, and State of New York, have invented a new and useful Improvement in Galvanic Batteries, of which the following is a full, true, and exact description, reference being had to the accompanying drawings.

This improvement relates to the electro-negative element of a galvanic battery, and is especially applicable to the form of batteries in which zinc is used for the positive pole and a solution of sal-ammoniac as the exciting-liquid. In batteries like that patented to G. L. Leclanché, November 16, 1880, No. 234,413, great liability exists to the destruction of the conglomerate containing peroxide of manganese by the short-circuiting of the battery, and therefore the electro-negative element in that battery is so arranged as to substitute new prisms for those which may be destroyed by removing the rubber bands. It is found practically, however, that these rubber bands do not insure the best possible connection with the center carbon, and they themselves become liable to deterioration, and after a while become useless. By my improvement I substitute a frictional contact for the spring rubber contact described in that patent, and I make a simple and improved element with a large amount of surface, and in which the conglomerate plates may be readily removed and new ones substituted when desired.

Figure 1:
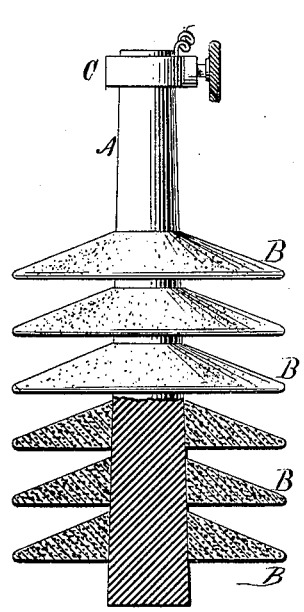
Figure 3:
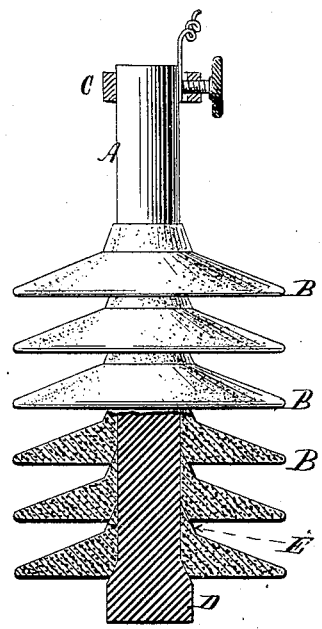
Figure 2:
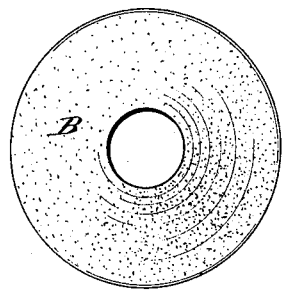
Figure 4:
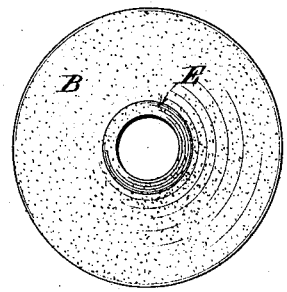

My invention will be readily understood from the accompanying drawings, in which Figure 1 represents a vertical view, partly in section, and Fig. 2 a top view, of one of the conglomerate disks shown in Fig. 1. Figs. 3 and 4 represent the same views, the structure being slightly modified.

In my drawings, as shown in Figs. 1 and 2, A represents a conical rod of carbon, which may be the ordinary carbon conglomerate produced by grinding up retort-carbon, cementing together, and baking. Surrounding this are the conical disks B B B, which have center openings corresponding to the size of the center carbon at the point where they are to rest. In practice they are numbered consecutively, so as to be readily placed upon the center carbon. These disks may be made of the strongly electro-negative mixture described in the Letters Patent to Leclanché, hereinbefore referred to, though I may use carbon alone, if I so desire. By simply placing these disks around the center carbon and pressing them firmly to position a contact is established which is not liable to rupture, and in which no other mechanism is employed except the two carbon bodies to insure the continuity of contact.

At C is shown a suitable collar for connecting the wire to carry the current, though any other suitable means may be employed.

In Figs. 3 and 4 the same arrangement is shown, with this modification: The carbon central rod is cylindrical except at its lower end, where it is expanded, forming a support or base for the lowest conglomerate disk. These conglomerate disks are provided with conical hollows beneath them and conical upwardly-projecting lips, so that they readily fit one upon the other. In this case any disk can occupy any situation on the carbon rod. For most purposes I prefer the form shown in Fig. 1, however.

What I claim as my invention, and desire to secure by Letters Patent, is—

1. The combination of a central conical conducting-rod with surrounding disks, substantially flat and circular, composed in whole or in part of carbon, substantially as described.

2. The combination of a conical conducting-rod with surrounding disks having conical holes therein, themselves composed in whole or in part of carbon, thereby insuring a good contact between the disks and the center conducting-rod, substantially as described.

3. The combination of the rod A and disks B, provided with projecting lips E, thereby enabling the disks to fit tightly upon each other, substantially as described.

HORATIO J. BREWER.

Witnesses:
GEO. H. EVANS,
WM. A. POLLOCK.